United States Patent
Asayama et al.

(10) Patent No.: US 6,537,181 B2
(45) Date of Patent: Mar. 25, 2003

(54) CLUTCH CONTROL DEVICE AND METHOD FOR USE IN CONTINUOUSLY VARIABLE TRANSMISSION

(75) Inventors: Hiroki Asayama, Aichi (JP); Kaoru Kondo, Aichi (JP); Toru Hashimoto, Aichi (JP); Minoru Shouichi, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/800,737

(22) Filed: Mar. 8, 2001

(65) Prior Publication Data

US 2001/0034285 A1 Oct. 25, 2001

(30) Foreign Application Priority Data

Mar. 8, 2000 (JP) ........................................ 2000-063754

(51) Int. Cl.7 ............................................. B60K 41/02
(52) U.S. Cl. ...................................... 477/174; 477/180
(58) Field of Search ............................. 477/39, 62, 86, 477/168, 174, 180

(56) References Cited

U.S. PATENT DOCUMENTS 4,662,488 A * 5/1987 Hiramatsu et al. ......... 192/3.31
5,050,715 A * 9/1991 Itoh et al. ..................... 192/3.3
6,022,293 A * 2/2000 Dourra et al. ............... 475/127

FOREIGN PATENT DOCUMENTS

| JP | 60-060368 A | | 4/1985 |
| JP | 3-260465 A | | 11/1991 |
| JP | 4-203560 A | | 7/1992 |
| JP | 40526391 A | * | 10/1993 |
| JP | 8277932 | | 10/1996 |

* cited by examiner

Primary Examiner—Christopher P. Schwartz
Assistant Examiner—Xuan Lan Nguyen
(74) Attorney, Agent, or Firm—Birch, Stewart, Kolasch & Birch, LLP (57) ABSTRACT

A clutch control device of a continuously variable transmission is provided with a clutch control part, which controls the engagement state of a clutch. The minimum engaging force, which is capable of maintaining the completely engaged state of the clutch, is predetermined to increase according to an increase in engine torque. The clutch control unit has an engaging force setting part, which sets the target engaging force for the clutch to a higher value than the minimum engaging force by a predetermined value. The clutch control unit controls the engagement state of the clutch so that the actual engaging force for the clutch can be higher than the minimum engaging force by the predetermined value. Therefore, the clutch control device can improve the fuel economy and prevent a shift shock when there is a rapid increase in the engine torque.

9 Claims, 6 Drawing Sheets

54: clutch control part
54A: pressing force setting part
54B: predetermined value changing part
55: gear ratio determination part

54: clutch control part

54A: pressing force setting part

54B: predetermined value changing part

55: gear ratio determination part

FIG. 2

54: clutch control part
54A: pressing force setting part
54B: predetermined value changing part
55: gear ratio determination part

FIG. 5

CLUTCH CONTROL DEVICE AND METHOD FOR USE IN CONTINUOUSLY VARIABLE TRANSMISSION

CROSS REFERENCE

This application claims the benefit of Japanese Application No. 2000-063754, filed on Mar. 8, 2000, which is hereby incorporated by reference.

BACKGROUND OF THE INVENTION

1. Field of the Invention

The present invention relates to a clutch control device of a continuously variable transmission provided in a vehicle.

2. Description of Related Art

In multistage automatic transmissions and continuously variable transmissions, a torque converter as an example of a power transmission means is provided between an engine and a transmission. The torque converter relieves a shift shock when the torque of the engine is inputted to the transmission when a vehicle is started or is rapidly accelerated.

At the interior of the torque converter, there is provided a hydraulic control type lockup clutch, which is capable of completely engaging an input shaft connected to an output shaft of the engine with an output shaft connected to an input shaft of the transmission in order prevent a slip between them. By completely engaging the lockup clutch, the engaged state of the input shaft and the output shaft of the torque converter can be switched from an engaged state caused by fluid friction of the torque converter to an engaged state caused by mechanical friction of the lockup clutch. This improves the fuel economy.

The above hydraulic control type lockup clutch controls the engagement state of the input shaft with the output shaft in the torque converter according to engaging force that is adjusted by pressing force, with which the lockup clutch is pressed by hydraulic pressure. While the lockup clutch is completely engaged, the hydraulic pressure for adjusting the pressing force against the lockup clutch is constantly set to the maximum value. The pressing force is set to such a high value as to prevent the slip of the lockup clutch.

If the lockup clutch is completely engaged in the state wherein a driver lifts a foot from an accelerator pedal to bring a throttle angle to zero (i.e., the lift-foot state), a shift shock occurs when the driver operates the accelerator pedal next time, and more particularly when the engine torque increases instantaneously, e.g., during a kick down shift. In order to avoid such a shift shock, the pressing force against the lockup clutch is adjusted in such a manner as to release the lockup clutch from the completely engaged state in the lift-foot state.

In the case of the multistage automatic transmission which change gears step by step, it is necessary to release the lockup clutch from the completely engaged state in order to avoid shift shock when the gears are changed. In the case of the continuously variable transmission, however, the gear ratios are changed continuously and it is therefore unnecessary to release the lockup clutch from the completely engaged state when the gear ratios are changed.

When the engine torque increases instantaneously e.g., during a kick down shift, the continuously variable transmission causes a shift shock as is the case with the multistage automatic transmission if the lockup clutch is completely engaged. To prevent such a shift shock, the continuously variable transmission preferably releases the lockup clutch from the completely engaged state.

The release of the lockup clutch from the completely engaged state, however, lowers the efficiency of the transmission and deteriorates the fuel economy. Accordingly, there is a desire to avoid the release of the lockup clutch from the completely engaged state.

SUMMARY OF THE INVENTION

It is therefore an object of the present invention to provide a clutch control device and method for use in a continuously variable transmission, which is able to improve the fuel economy and prevent a shift shock when there is a rapid increase in the engine torque.

The above object can be accomplished by providing a clutch control device for a continuously variable transmission, the clutch control device comprising: a clutch mechanism provided between an engine and the continuously variable transmission, the clutch mechanism being capable of variably engaging an output shaft of the engine with an input shaft of the continuously variable transmission from an unengaged state to a completely engaged state; a control unit for controlling an engagement state of the clutch mechanism; wherein the control unit has an engaging force setting part for setting a target engaging force according to engine torque; and the engaging force setting part sets a minimum engaging force capable of maintaining the completely engaged state of the clutch mechanism according to the engine torque and further sets the target engaging force to a value that is found by adding a predetermined value to the minimum engaging force.

The present invention can also be accomplished by providing a clutch control method for a continuously variable transmission, the clutch control method comprising the steps of: estimating engine torque from an engine operating state; setting a minimum engaging force capable of maintaining a completely engaged state of the clutch mechanism according to the estimated engine torque; setting a target engaging force of a clutch mechanism of the continuously variable transmission by adding a predetermined value to the minimum engaging force; and controlling the clutch mechanism according to that target engaging force.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 1(*a*) and 1(*b*) are conceptual diagrams of assistance in describing a power transmission system of a vehicle equipped with a continuously variable transmission according to an embodiment of the present invention, wherein FIG. 1(*a*) is a conceptual block diagram showing a power transmission system including the continuously variable transmission and FIG. 1(*b*) is a block diagram showing the continuously variable transmission;

DETAILED DESCRIPTION OF THE PREFERRED EMBODIMENT

A preferred embodiment of the present invention will be described hereinbelow with reference to the accompanying drawings. FIGS. 1 through 5 show a clutch control device of a continuously variable transmission according to an embodiment of the present invention.

Figure 1:
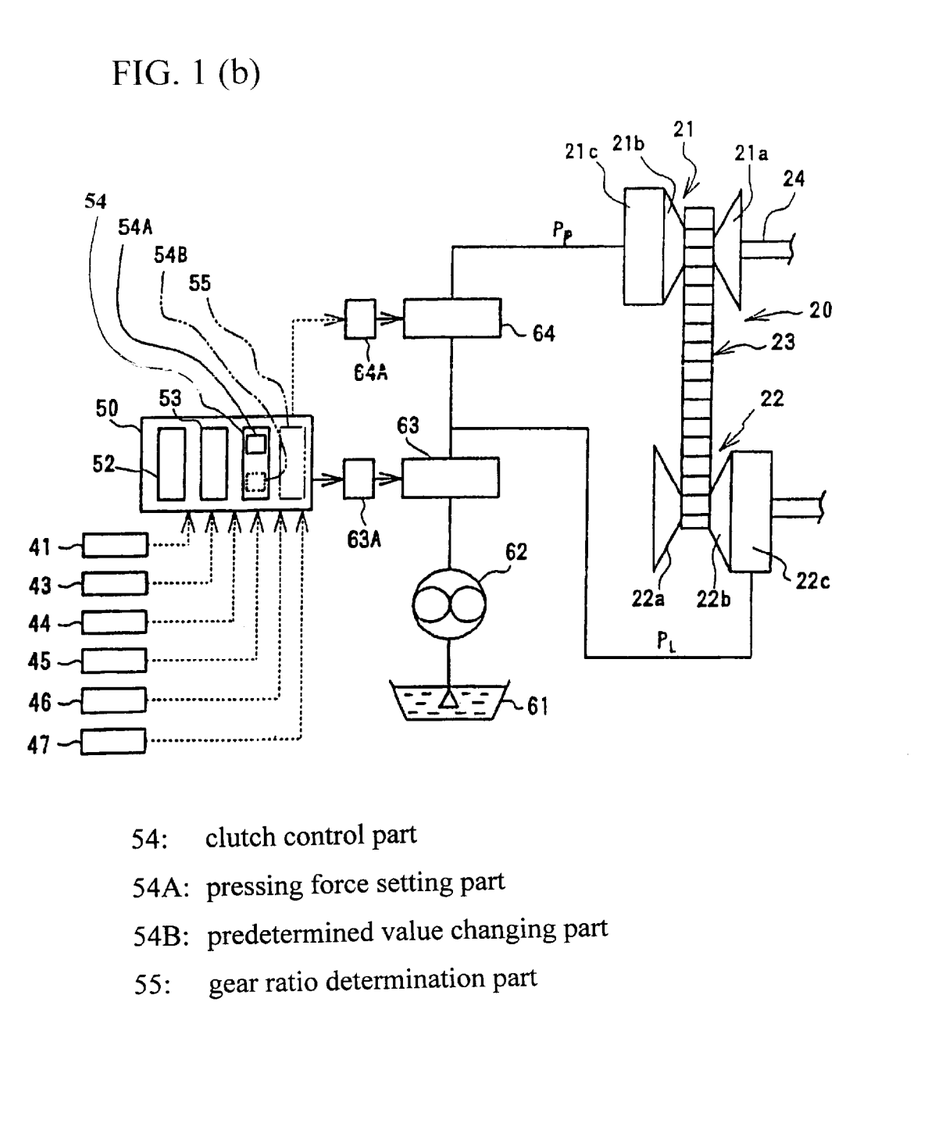
Figure 1A:
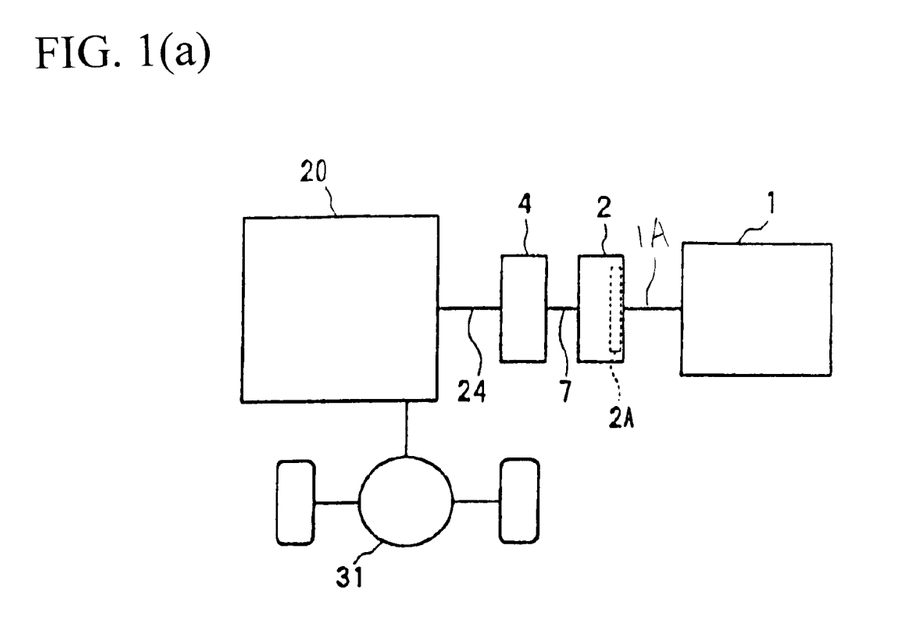

A description will now be given of a power transmission system of a vehicle equipped with the continuously variable transmission according to the present embodiment. In the power transmission system, torque outputted from an engine 1 is transmitted to a belt type continuously variable transmission 20 through a torque converter 2 as a fluid coupling, and is also transmitted from a counter shaft (not shown) to a front differential device 31 as shown in FIG. 1(a).

Figure 2:
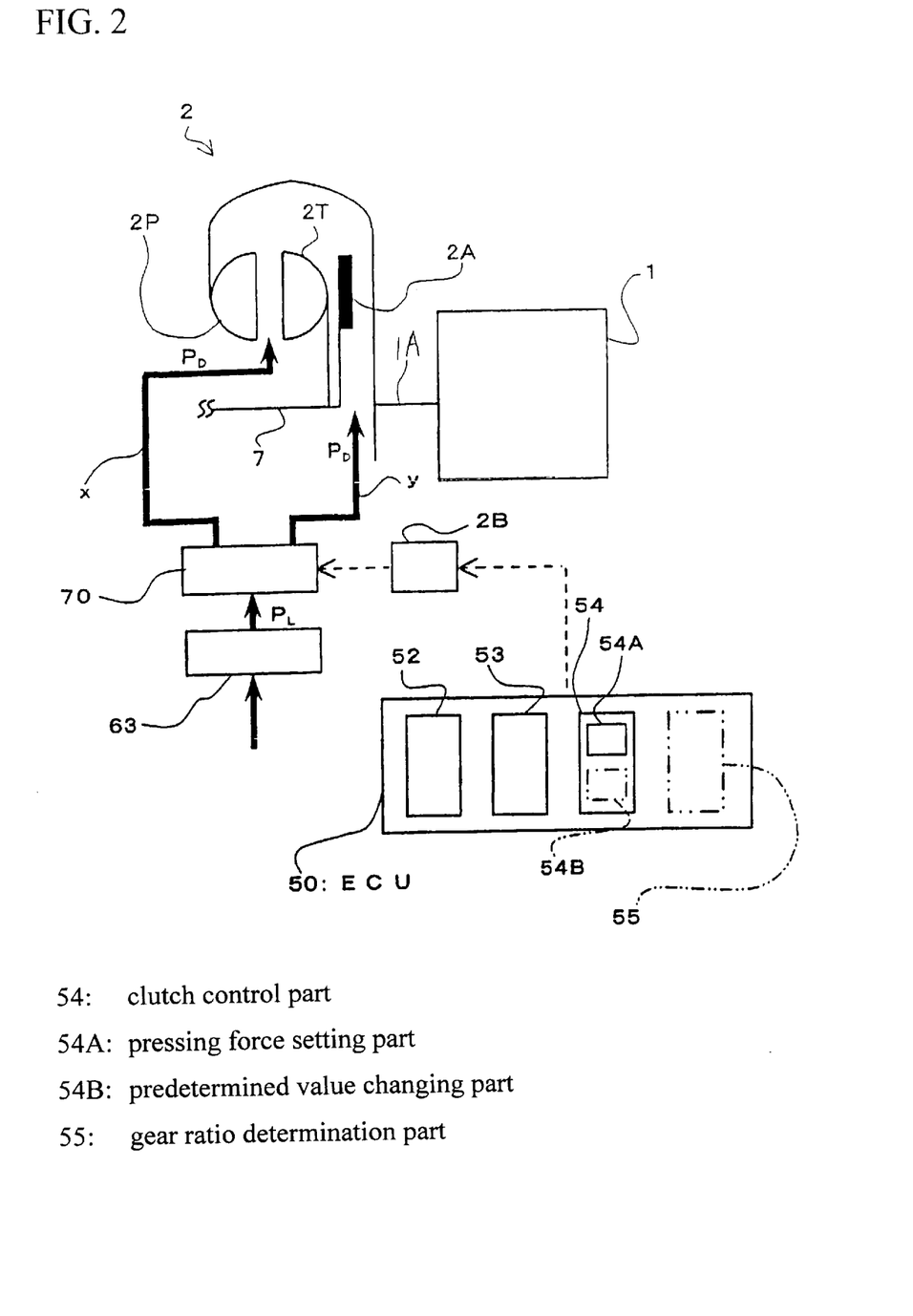
FIG. 2 is a conceptual diagram showing a principal part of a clutch control device of a continuously variable transmission according to an embodiment of the present invention.

As shown in FIG. 2, the torque converter 2 has a pump 2P that rotates integrally with an input shaft 1A connected to the engine 1; and a turbine 2T that rotates integrally with an output shaft 7 connected to an input shaft 24 of the continuously variable transmission 20 through a later-described normal rotation/inversion switching mechanism 4 (FIG. 1(a)). The torque of the pump 2P is transmitted to the turbine 2T by pumping operation of fluids between the pump 2P and the turbine 2T, and therefore, the torque outputted from the engine 1 is transmitted to the continuously variable transmission 20.

The torque converter 2 also has a lockup clutch 2A that is capable of engaging the input shaft 1A with the output shaft 7. The integral engagement of the input shaft 1A with the output shaft 7 by the operation of the lockup clutch 2A results in the engagement of the output shaft of the engine 1 with the input shaft of the continuously variable transmission 20. Moreover, the engagement state of the input shaft 1A and the output shaft 7 of the torque converter 2 can be varied continuously between the unengaged state and the completely engaged state by controlling the engagement state of the lockup clutch 2A.

The torque converter 2 is supplied with line pressure PL, which is regulated by a later-described regulator valve 63, through a lockup clutch control valve 70. A solenoid valve 2B adjusts the lockup clutch control valve 70 to thereby control hydraulic pressure supplied to the torque converter 2. The torque converter 2 is supplied with hydraulic pressure from the lockup clutch control valve 70 through oil channels x and y. The lockup clutch control valve 70 controls the supplied state of the hydraulic pressure to the oil channels x and y to thereby control the engagement state of the lockup clutch 2A. In this structure, the lockup clutch 2A is engaged if the oil channel x is supplied with hydraulic pressure $P_D$ from the lockup clutch control valve 70; and the lockup clutch 2A is disengaged if the oil channel y is supplied with hydraulic pressure $P_D$.

According to the present embodiment, the original pressure of the lockup clutch control valve 70 is the line pressure $P_L$, which is acquired by regulating the hydraulic pressure generated by an oil pump with the regulator valve 63. The present invention, however, should not be restricted to this. For example, the original pressure of the lockup clutch control valve 70 to be supplied to the torque converter 2 may be the hydraulic pressure which is acquired by reducing the line pressure $P_L$ with a reducing valve (not shown) provided between the regulator valve 63 and the lockup clutch control valve 70.

As shown in FIG. 1(a), the normal rotation/inversion switching mechanism 4 is provided between the output shaft 7 of the torque converter 2 and the input shaft 24 of the continuously variable transmission 20. The torque received from the engine 1 through the torque converter 2 is inputted to the continuously variable transmission through the normal rotation/inversion switching mechanism 4. The continuously variable transmission 20 is a hydraulic type continuously variable transmission, which controls the shift and the like by hydraulic control as described later.

The continuously variable transmission 20 will now be described in further detail. As shown in FIG. 1(b), the continuously variable transmission 20 comprises a primary pulley 21, a secondary pulley 22 and a belt 23. The torque, which is inputted from the normal rotation/inversion switching mechanism 4 to a primary shaft 24 as an input shaft, is inputted to the secondary pulley 22 from the primary pulley 21, which is axially integrated with the primary shaft 24, through the belt 23.

The primary pulley 21 is comprised of a pair of sheaves 21a, 21b and the secondary pulley 22 is comprised of a pair of sheaves 22a, 22b. Each pair of sheaves is capable of rotating integrally. The sheaves 21a, 22a are fixed sheaves that are axially fixed, whereas the sheaves 21b, 22b are moving sheaves that are able to move axially.

Oil chambers of hydraulic cylinders 21c, 22c are supplied with control hydraulic pressure, which is acquired by pressuring hydraulic fluids in an oil tank 61 with an oil pump 62. Pressing force of the moving sheaves 21b, 22b against the fixed sheaves 21a, 22a is adjusted correspondingly. The hydraulic cylinder 22c of the secondary pulley 22 is supplied with hydraulic fluids, which are regulated to be line pressure $P_L$ by a regulator valve 63. The hydraulic cylinder 21c of the primary pulley 21 is supplied with hydraulic fluids that are acquired by adjusting the flow rate of the line pressure $P_L$, regulated by the regulator valve 63, with a shift control valve 64. The hydraulic fluids operate as primary pressure $P_P$, which is hydraulic pressure for use in adjusting the gear ratio. The regulator valve 63 is controlled by executing a duty cycle control of a line pressure control solenoid 63A according to electric signals. Likewise, the shift control valve 64 is controlled by executing a duty cycle control of a shift control solenoid 64A according to electric signals.

The line pressure $P_L$ supplied to the hydraulic cylinder 22c of the secondary pulley 22 and the primary pressure $P_P$ supplied to the hydraulic cylinder 21c of the primary pulley 21 are controlled according to command signals from an electronic control unit "ECU" 50 (control unit).

More specifically, as shown in FIG. 1(b), the ECU 50 receives sensor signals, which are outputted from an engine revolution speed sensor 41 such as a crank angle sensor and a cam angle sensor; a throttle angle sensor 46; a first revolution speed sensor 43 for detecting the revolution speed of the primary pulley 21; a second revolution speed sensor 44 for detecting the revolution speed of the secondary pulley 22; a line pressure sensor 45 for detecting the line pressure $P_L$; a primary pressure sensor 47 for detecting the primary pressure $P_P$ and the like. According to the sensor signals, the ECU 50 controls the regulator valve 63 and the shift control valve 64 provided in a hydraulic supply circuit, which supplies hydraulic pressure to the pulleys 21, 22.

As shown in FIG. 1(b) and FIG. 2, the ECU 50 has a shift control part 52 with a function of controlling the gear ratio by controlling the shift control valve 64; a line pressure control part 53 with a function of controlling the line pressure $P_L$ by controlling the regulator valve 63, and a clutch control part 54 with a function of controlling the engagement state of the lockup clutch 2A.

The clutch control part 54 has a pressing force setting part 54A for setting target pressing force Fo as target engaging force, which controls the engagement state of the lockup clutch 2A. The clutch control part 54 executes the duty cycle control of the solenoid valve 2B with electric signals. The clutch control part 54 also controls actual pressing force F against the lockup clutch 2A by adjusting hydraulic fluid pressure $P_D$ of hydraulic fluid supplied to the lockup clutch 2A, so that the actual pressing force F against the lockup clutch 2A is achieved to the target pressing force Fo set by the pressing force setting part 54A.

Figure 3:
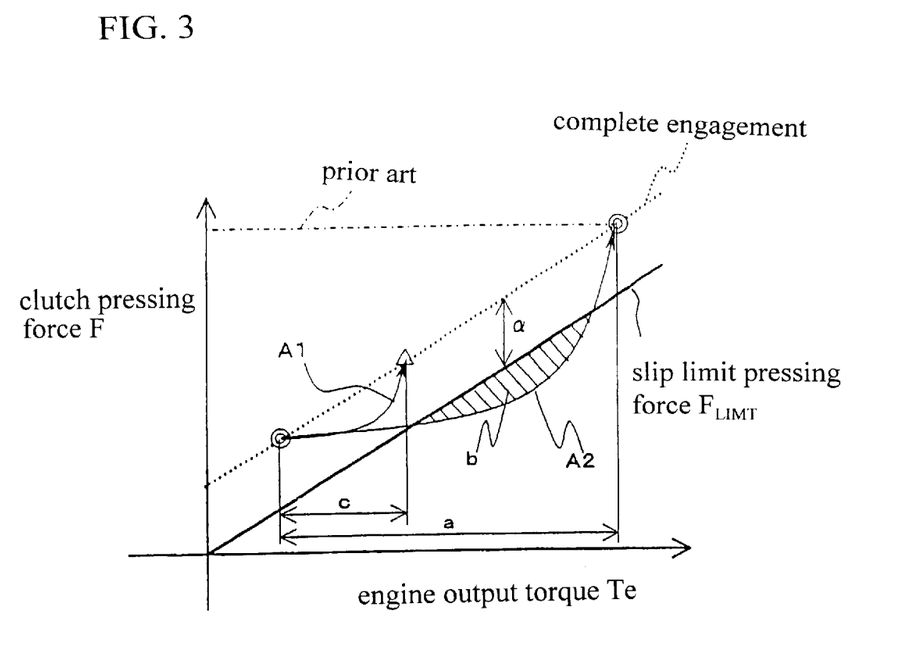
FIG. 3 is an explanation drawing showing the operation of a clutch control device of a continuously variable transmission according to an embodiment of the present invention, and is also a conceptual diagram showing the setting of clutch engaging force with respect to engine torque.

The pressing force setting part 54A sets the target pressing force Fo against the lockup clutch 2A, i.e., according to a map in FIG. 3. Conventionally, a pressing force, which is required for achieving the completely engaged state, is set to a constant high value regardless of engine torque Te as indicated by alternate long and short dash line in FIG. 3. According to the present embodiment, however, as indicated by solid line in FIG. 3, a slip limit pressing force $F_{LIMIT}$, which is the minimum value of the pressing force capable of maintaining the completely engaged state of the lockup clutch 2A, is set in such a manner as to increase correspondingly to the increase in the engine torque Te. More specifically, when the actual pressing force F against the lockup clutch 2A becomes lower than the slip limit pressing force $F_{LIMIT}$, the engaged state of the lockup clutch 2A is changed to a slipping engaged state from the completely engaged state and the lockup clutch 2A starts slipping. As indicated by a dotted line in FIG. 3, the target pressing force Fo for use in completely engaging the lockup clutch 2A is then set by adding a predetermined value α to the slip limit pressing force $F_{LIMIT}$.

A description will now be given of the predetermined value α.

The engine 1 drives the oil pump 62, which supplies the hydraulic fluids operating as the pressing force against the lockup clutch 2A. The solenoid valve 2B, which adjusts the hydraulic fluid pressure PD of the hydraulic fluids supplied to the lockup clutch 2A, causes a control delay.

Accordingly, there is a response delay of the hydraulic fluid pressure $P_D$ with respect to the engine torque Te while the hydraulic fluid pressure $P_D$ is changed according to the engine torque Te. This results in a response delay of the actual pressing force F, which acts according to the hydraulic fluid pressure $P_D$, with respect to the engine torque Te. The more rapidly the engine torque changes, the longer the response delay becomes.

For the reasons stated above, the clutch control device of the present embodiment sets the predetermined value α at a proper value with the response delay of the actual pressing force F with respect to the engine torque Te being taken into consideration. More specifically, the predetermined value α is determined so that if the engine torque Te increases relatively slowly, the completely engaged state of the lockup clutch 2A can be maintained so as to efficiently transmit the engine torque Te to the continuously variable transmission 20, and that if the engine torque Te rapidly increases, the lockup clutch 2A can be released from the completely engaged state to slip so as to relieve the shift shock when the vehicle is started or is rapidly accelerated.

Therefore, if a variation in the throttle angle is small and a variation in the engine torque Te per a predetermined time is relatively small as indicated by an arrow A1 in FIG. 3, i.e., if the engine torque Te tends to increase by a relatively small degree, the actual pressing force F never becomes smaller than the slip limit pressing force $F_{LIMIT}$ even if there is a response delay of the actual pressing force F with respect to the engine torque Te. Therefore, the lockup clutch 2A is held in the completely engaged state. On the other hand, if a variation in the throttle angle is large and a variation in the engine torque Te per a predetermined time is relatively large as indicated by an arrow A2 in FIG. 3, i.e., if the engine torque Te tends to increase by a relatively large degree, the actual pressing force F temporarily becomes smaller than the slip limit pressing force $F_{LIMIT}$ due to the response delay in a region b indicated by diagonal lines in FIG. 3. Consequently, the lockup clutch 2A is temporarily released from the completely engaged state and slips.

If the predetermined value α is too large, a shift shock easily occurs because the lockup clutch 2A could not slip easily. On the other hand, if the predetermined value α is too small, the fuel economy deteriorates because the lockup clutch 2A would slip too easily. For this reason, the predetermined value α is determined in such a manner as to balance the control of the shift shock and the improvement in the fuel economy.

The engine torque Te is calculated or estimated from an intake air flow detected by an air flow sensor (not shown), intake manifold pressure detected by a boost pressure sensor (not shown), and the like.

Figure 4:
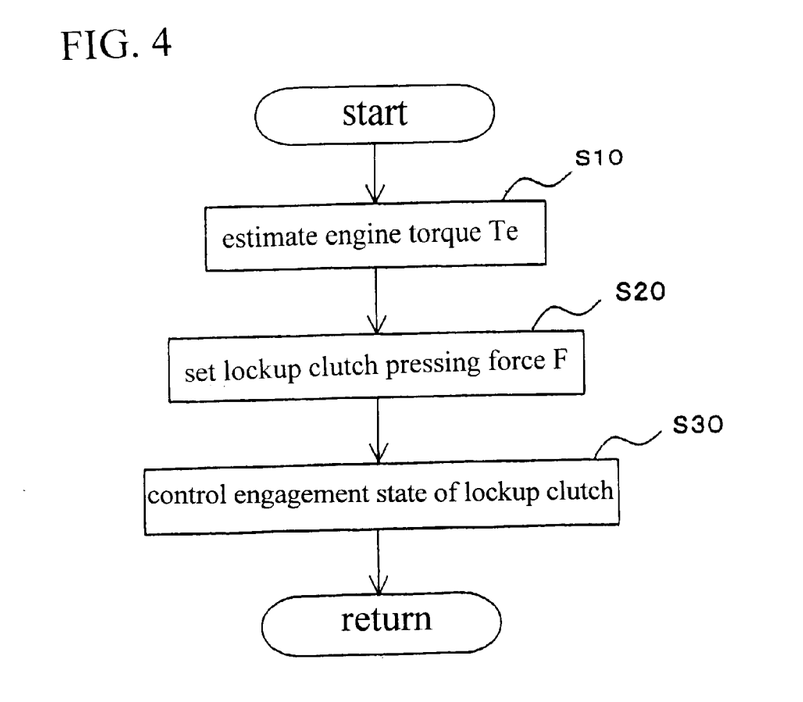
FIG. 4 is a flow chart of assistance in describing a method of setting clutch engaging force by a clutch control device of a continuously variable transmission according to an embodiment of the present invention.

The clutch control device of the present embodiment, which is constructed in the above-mentioned manner, is controlled as shown in the flow chart of FIG. 4 for example. First, in step S10, the engine torque Te is estimated from the intake air flow, the intake manifold pressure and the like. In the next step S20, the predetermined value α is added to the slip limit pressing force $F_{LIMIT}$, which is determined according to the engine torque Te, i.e., as indicated by a solid line in FIG. 3, and the target pressing force Fo against the lockup clutch 2A is then determined as indicated by a dotted line in FIG. 3. In the next step S30, the engagement state of the lockup clutch 2A is controlled based on the target pressing force Fo.

Therefore, the clutch control device of the present embodiment has an advantage as follows. If a variation in the engine torque Te per a predetermined time is relatively small as shown in a section c in FIG. 3 and a shift shock hardly occurs even if the lockup clutch 2A is held in the completely engaged state, the actual pressing force F never becomes lower than the slip limit pressing force $F_{LIMIT}$ as indicated by the arrow A1 in FIG. 3 because there is only a short response delay of the actual pressing force F with respect to the engine torque Te. This makes it possible to maintain the completely engaged state of the lockup clutch 2A and efficiently transmit the engine torque Te to the continuously variable transmission 20, thus improving the fuel economy.

On the other hand, if a variation in the engine torque Te per a predetermined time is relatively large as shown in a section a in FIG. 3 and the completely engaged state of the lockup clutch 2A is expected to cause a great shift, there is a long response delay of the actual pressing force F with respect to the engine torque Te. Thus, the actual pressing force F changes as indicated by the arrow A2 in FIG. 3, and becomes lower than the slip limit pressing force $F_{LIMIT}$ in a region b indicated by the diagonal lines in FIG. 3. In the region b, the lockup clutch 2A is temporarily released from the completely engaged state to slip, and this prevents the shift shock.

Moreover, the clutch control device of the present embodiment is able to achieve the above-mentioned effects with a very simple system, in which the target pressing force Fo against the lockup clutch 2A is determined according to the engine torque Te. For this reason, there is no necessity of adding any new equipment to a conventional device.

The clutch control device of the present invention should not be limited to the embodiment described above. For example, the predetermined value α for setting the value of the target pressing force Fo with respect to the slip limit pressing force $F_{LIMIT}$ is a constant value according to the embodiment; however, the predetermined value α may be changed according to a predetermined parameter.

For example, the clutch control device of the above embodiment may be further provided with a gear ratio determination part 55, which determines a gear ratio of the continuously variable transmission 20; and a predetermined value changing part 54B, which is provided in the clutch control part 54 in order to change the predetermined value α. The predetermined changing part 54B changes the predetermined value α according to the gear ratio determined by the gear ratio determination part 55. The gear ratio determination part 55 determines the gear ratio of the transmission according to the revolution speed $N_P$ of the primary pulley 32 detected by the first revolution speed sensor 43 and the revolution speed $N_S$ of the secondary pulley 22 detected by the second revolution speed sensor 44.

Figure 5:
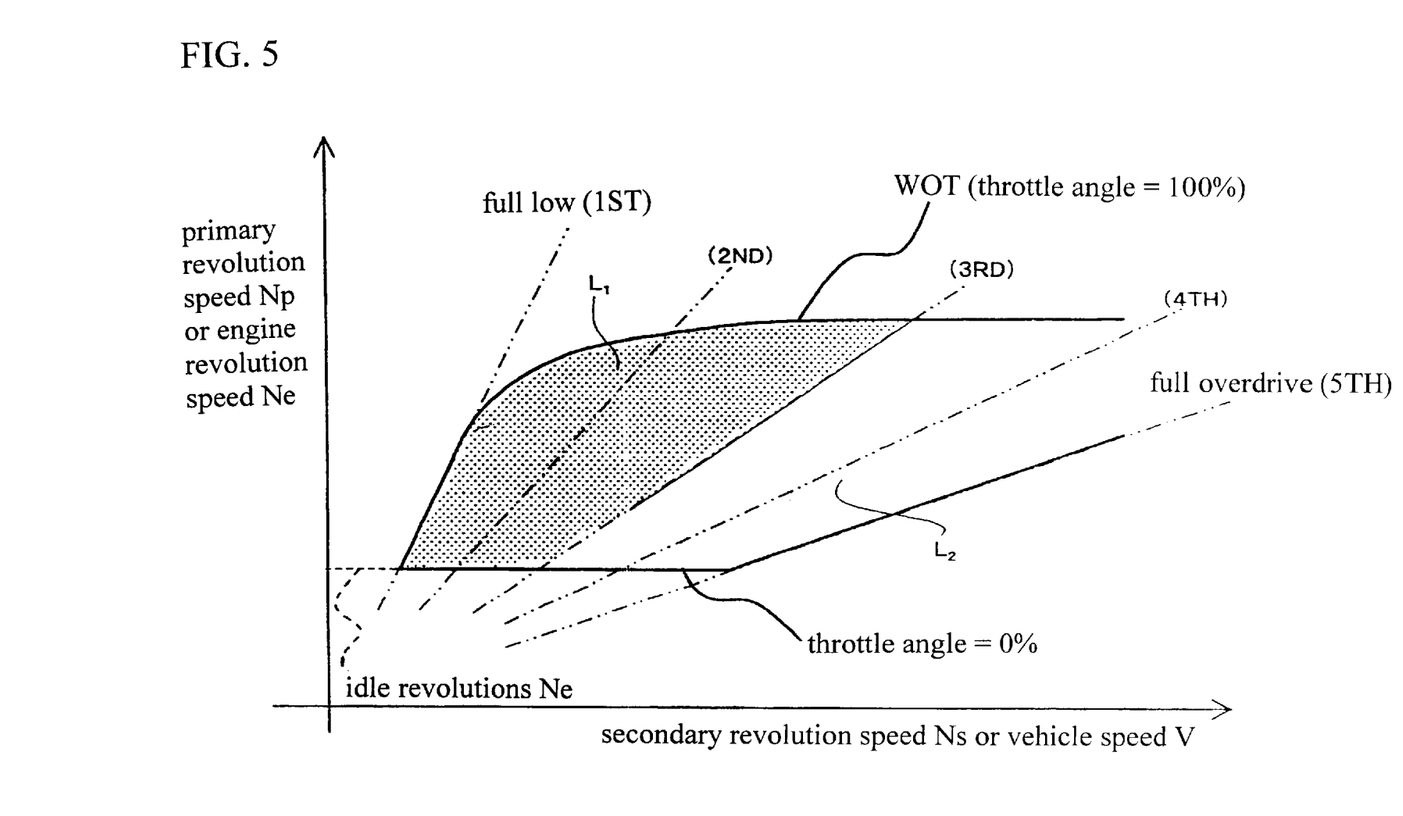
FIG. 5 is a map showing variations in a gear ratio of assistance in describing a method of setting clutch pressing force by a modified example of a clutch control device of a continuously variable transmission according to an embodiment of the present invention.

An example of a method for changing the predetermined value α will now be described with reference to FIG. 5. FIG. 5 is a map showing the change in the gear ratio. The horizontal line indicates the revolution speed $N_S$ of the secondary pulley 22 or the vehicle speed V, and the vertical line indicates the revolution speed $N_P$ of the primary pulley 21 or the engine revolution speed Ne. Long and short alternate dash lines in FIG. 5 indicate gear ratios, which are equivalent to gear speed positions in a multistage automatic transmission. For example, if the gear ratio determined by the gear ratio determination part 55A lies within a low range $L_1$ where the gear ratio is not greater than a gear ratio equivalent to the third gear speed position in the multistage automatic transmission as is hatched in FIG. 5, the completely engaged state of the lockup clutch is expected to cause a great shift shock.

To address this problem, the predetermined value changing part 54B changes the predetermined value α according to the gear ratio determined by the gear ratio determination part 55. More specifically, the predetermined value changing part 54B corrects the predetermined value α so that that the predetermined value in the case where the gear ratio lies in the low range $L_1$ can be smaller than in the case where the gear ratio lies in an overdrive range $L_2$. Therefore, if the gear ratio lies in the low range $L_1$, the lockup clutch 2A can slip easily to surely prevent the shift shock. If the gear ratio lies in the overdrive range $L_2$, the lockup clutch 2A can be held in the completely engaged state to thereby improve the fuel economy.

The above-described embodiment is applied to the belt type continuously variable transmission, but the present invention may also be applied to other continuously variable transmissions such as a toroidal type continuously variable transmission.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A clutch control device for a continuously variable transmission, said clutch control device, comprising:

a clutch mechanism provided between an engine and said continuously variable transmission, said engine having an output shaft and said continuously variable transmission having an input shaft, said clutch mechanism being capable of variably engaging said output shaft of said engine with said input shaft of said continuously variable transmission from an unengaged state to a completely engaged state; and a control unit for controlling an engagement state of said clutch mechanism, wherein said control unit has an engaging force setting part for setting a target engaging force for said clutch mechanism according to engine torque, said engaging force setting part sets a minimum engaging force capable of maintaining the completely engaged state of said clutch mechanism according to said engine torque and further sets said target engaging force to a value that is found by adding a predetermined value to said minimum engaging force, and said predetermined value is determined so that an actual engaging force temporarily becomes smaller than said minimum engaging force when there is a large variation in said engine torque, and so that said actual engaging force is kept larger than said minimum engaging force when there is a small variation in said engine torque.

2. A clutch control device of a continuously variable transmission according to claim 1, wherein said predetermined value is determined according to a response delay of said actual engaging force with respect to said engine torque.

3. A clutch control device of a continuously variable transmission according to claim 1, wherein said control unit comprises:

a gear ratio determination part for determining a gear ratio of said continuously variable transmission; and a predetermined value changing part for changing said predetermined value according to the gear ratio determined by said gear ratio determination part.

4. A clutch control device of a continuously variable transmission according to claim 4, wherein if the gear ratio determined by said gear ratio determination part lies in a low range, said predetermined value changing part changes said predetermined value to a smaller value than a predetermined value in an overdrive range.

5. A clutch control device of a continuously variable transmission according to claim 3, wherein said continuously variable transmission is a belt type continuously variable transmission provided with a primary pulley and a secondary pulley, and said gear ratio determination part determines the gear ratio according to a revolution speed ratio of said primary pulley to said secondary pulley.

6. A clutch control device of a continuously variable transmission according to claim 1, wherein the engagement state of said clutch mechanism is controlled by hydraulic pressure, and said control unit controls said actual engaging force by adjusting said hydraulic pressure.

7. A clutch control device of a continuously variable transmission according to claim 1, wherein a fluid coupling is provided between said engine and said continuously variable transmission, and said clutch mechanism is a clutch that is capable of engaging an input shaft with an output shaft of said fluid coupling.

8. A clutch control method for a continuously variable transmission, said clutch control method comprising the steps of:

estimating engine torque from an engine operating state;

setting a minimum engaging force capable of maintaining a completely engaged state of a clutch of said continuously variable transmission according to the estimated engine torque;

setting a target engaging force of said clutch mechanism by adding a predetermined value, determined so that an actual engaging force temporarily becomes smaller than said minimum engaging force when there is a large variation in said engine torque, and so that said actual engaging force is kept larger than said minimum engaging force when there is a small variation in said engine torque, to said minimum engaging force; and controlling said clutch mechanism according to said target engaging force.

9. A clutch control method for a continuously variable transmission according to claim 8, said method further comprising the steps of:

determining a gear ratio of said continuously variable transmission; and changing said predetermined value according to the determined gear ratio.

* * * * *